(12) United States Patent
Watanabe

(10) Patent No.: US 7,230,643 B2
(45) Date of Patent: Jun. 12, 2007

(54) DIGITAL CAMERA WITH ELECTRONIC ZOOMING FUNCTION

(75) Inventor: Satoru Watanabe, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/424,640

(22) Filed: Jun. 16, 2006

(65) Prior Publication Data

US 2006/0227225 A1 Oct. 12, 2006

Related U.S. Application Data

(62) Division of application No. 10/186,530, filed on Jul. 1, 2002.

(30) Foreign Application Priority Data

Jul. 3, 2001 (JP) ............................. 2001-202518

(51) Int. Cl.
*H04N 5/262* (2006.01)
(52) U.S. Cl. ............................. 348/240.2; 348/240.99
(58) Field of Classification Search .......... 348/240.99, 348/240.2
See application file for complete search history.

(56) References Cited

U.S. PATENT DOCUMENTS 4,858,020 A * 8/1989 Homma ...................... 358/451
4,963,981 A * 10/1990 Todaka et al. ............ 348/240.2
6,529,640 B1 3/2003 Utagawa et al.
6,809,764 B1 10/2004 Misawa et al.
6,888,568 B1 5/2005 Neter
2003/0058346 A1* 3/2003 Bechtel et al. ......... 348/207.99
2005/0270395 A1 12/2005 Yoneda et al.

FOREIGN PATENT DOCUMENTS

| JP | 5-130477 A | 5/1993 |
|---|---|---|
| JP | 7-95543 A | 4/1995 |
| JP | 11-168652 A | 6/1999 |
| JP | 11-259646 A | 9/1999 |
| JP | 2001-61058 A | 3/2001 |

* cited by examiner

*Primary Examiner*—Tuan V. Ho
(74) *Attorney, Agent, or Firm*—Frishauf, Holtz, Goodman & Chick, P.C.

(57) ABSTRACT

Bayer data is captured by a CCD and is stored in a memory. Image data is read out from the memory in units of nine lines starting with $(4n+1)$-th (n: integer) line. YUV data of one pixel is formed based on 5×5 pixels in the read Bayer data. Thus, the YUV data is formed in units of five lines. The YUV data is enlarged by a pixel number converting unit.

14 Claims, 12 Drawing Sheets

|    | 1 | 2 | 3 | 4 | 5 | 6 | 7 | 8 | 9 | 10 | 11 | 12 |
|----|---|---|---|---|---|---|---|---|---|----|----|----|
| C1 | R | G | R | G | R | G | R | G | R | G  | R  | G  |
| C2 | G | B | G | B | G | B | G | B | G | B  | G  | B  |
| C3 | R | G | R | G | R | G | R | G | R | G  | R  | G  |
| C4 | G | B | G | B | G | B | G | B | G | B  | G  | B  |
| C5 | R | G | R | G | R | G | R | G | R | G  | R  | G  |
| C6 | G | B | G | B | G | B | G | B | G | B  | G  | B  |
| C7 | R | G | R | G | R | G | R | G | R | G  | R  | G  |

BAYER DATA → YUV DATA

YUV DATA

| | C1, 1 | C2, 1 | C3, 1 | C4, 1 | C5, 1 |
|---|---|---|---|---|---|
| | C1, 2 | C2, 2 | C3, 2 | C4, 2 | C5, 2 |
| | C1, 3 | C2, 3 | C3, 3 | C4, 3 | C5, 3 |
| FIRST BLOCK | C1, 4 | C2, 4 | C3, 4 | C4, 4 | C5, 4 |
| | C1, 5 | C2, 5 | C3, 5 | C4, 5 | C5, 5 |
| | C1, 6 | C2, 6 | C3, 6 | C4, 6 | C5, 6 |
| | C1, 7 | C2, 7 | C3, 7 | C4, 7 | C5, 7 |
| SECOND BLOCK | C1, 8 | C2, 8 | C3, 8 | C4, 8 | C5, 8 |
| | C1, 9 | C2, 9 | C3, 9 | C4, 9 | C5, 9 |
| | C1, 10 | C2, 10 | C3, 10 | C4, 10 | C5, 10 |
| | C1, 11 | C2, 11 | C3, 11 | C4, 11 | C5, 11 |
| | C1, 12 | | | | |

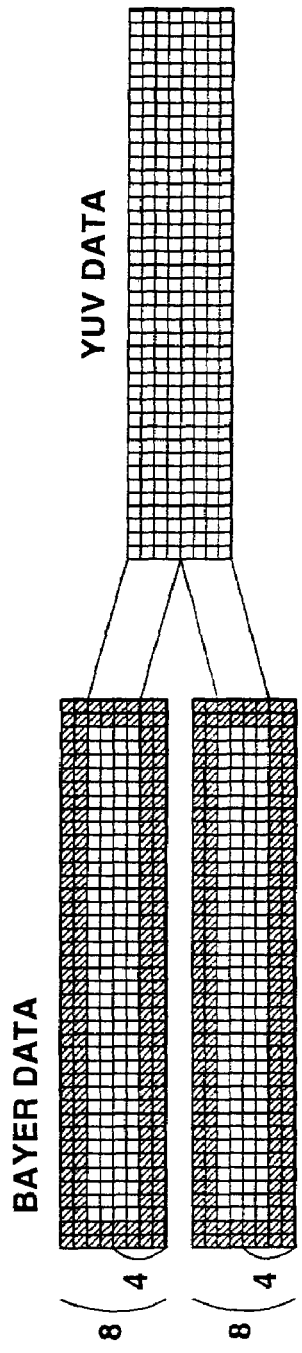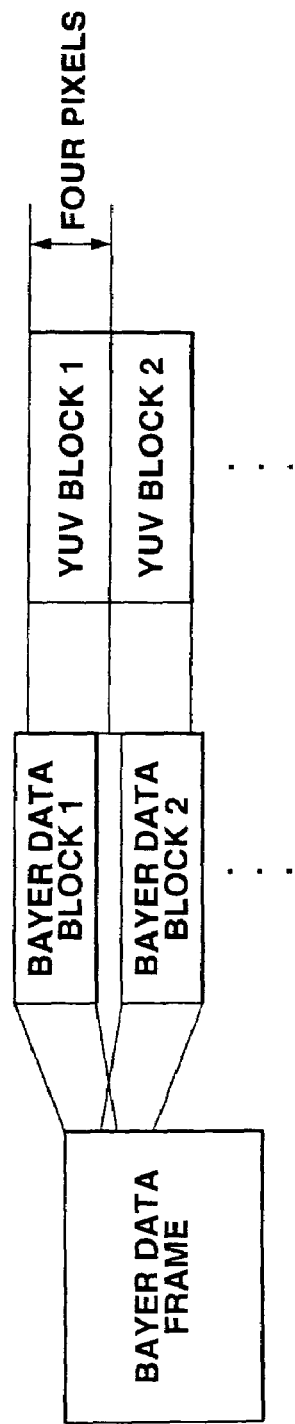
FIG.5A PRIOR ART
FIG.5B PRIOR ART

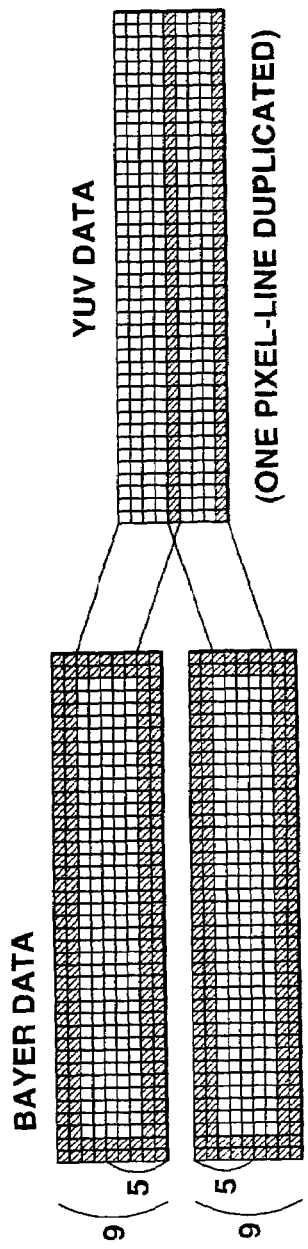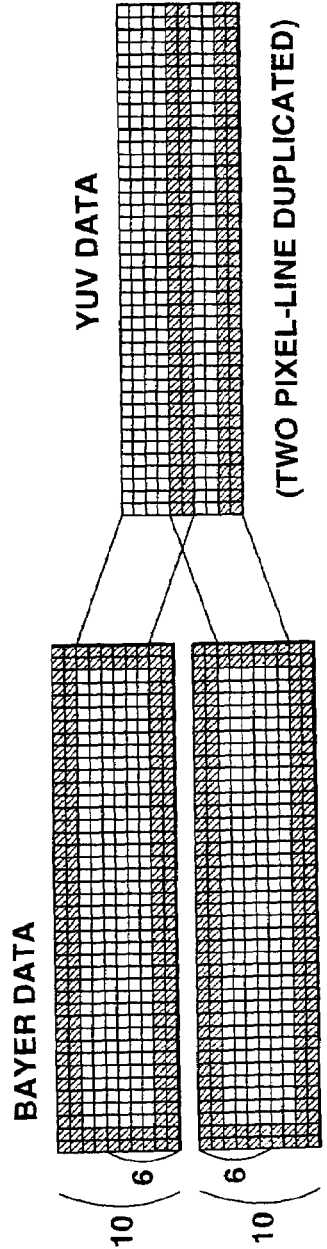

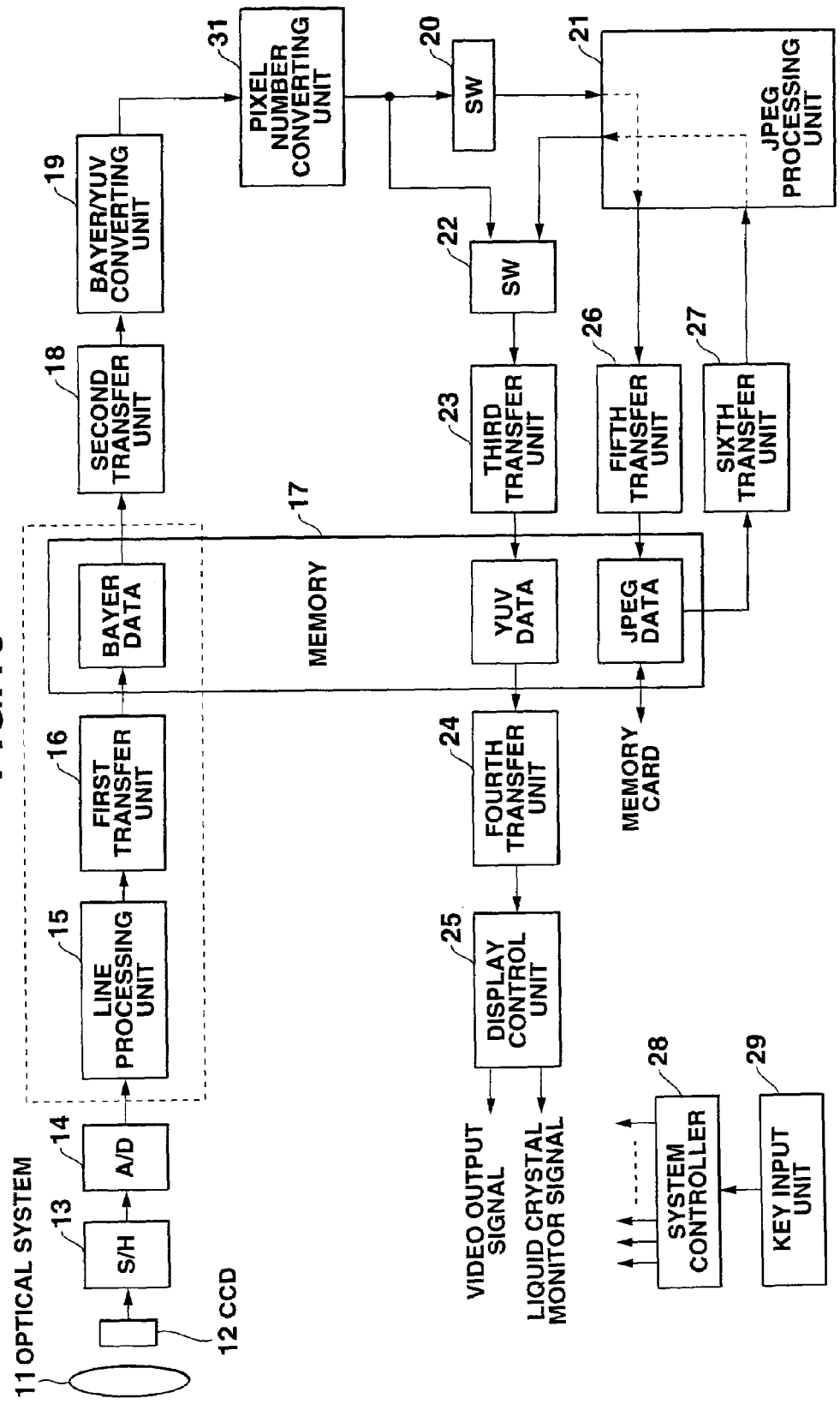

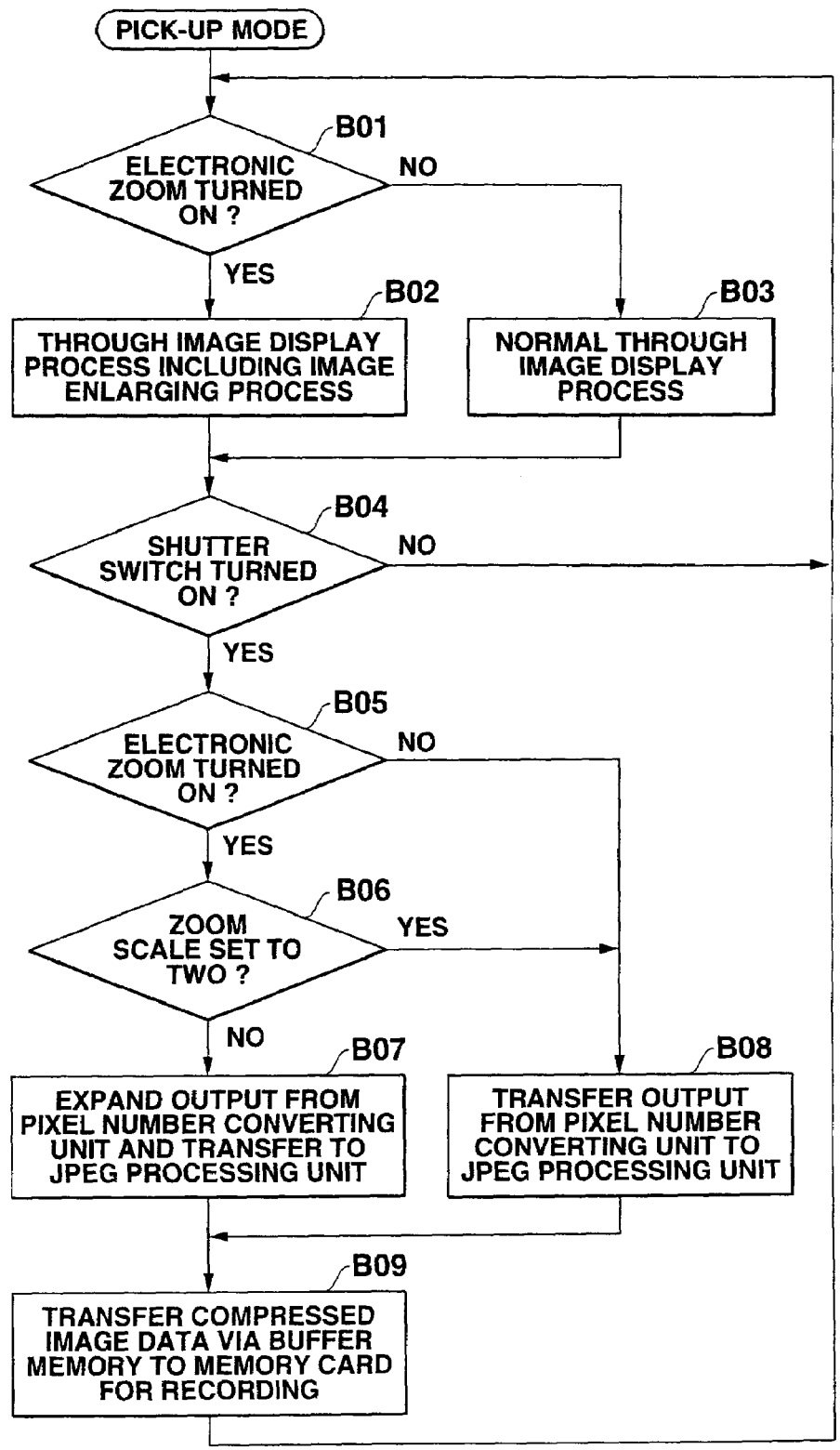

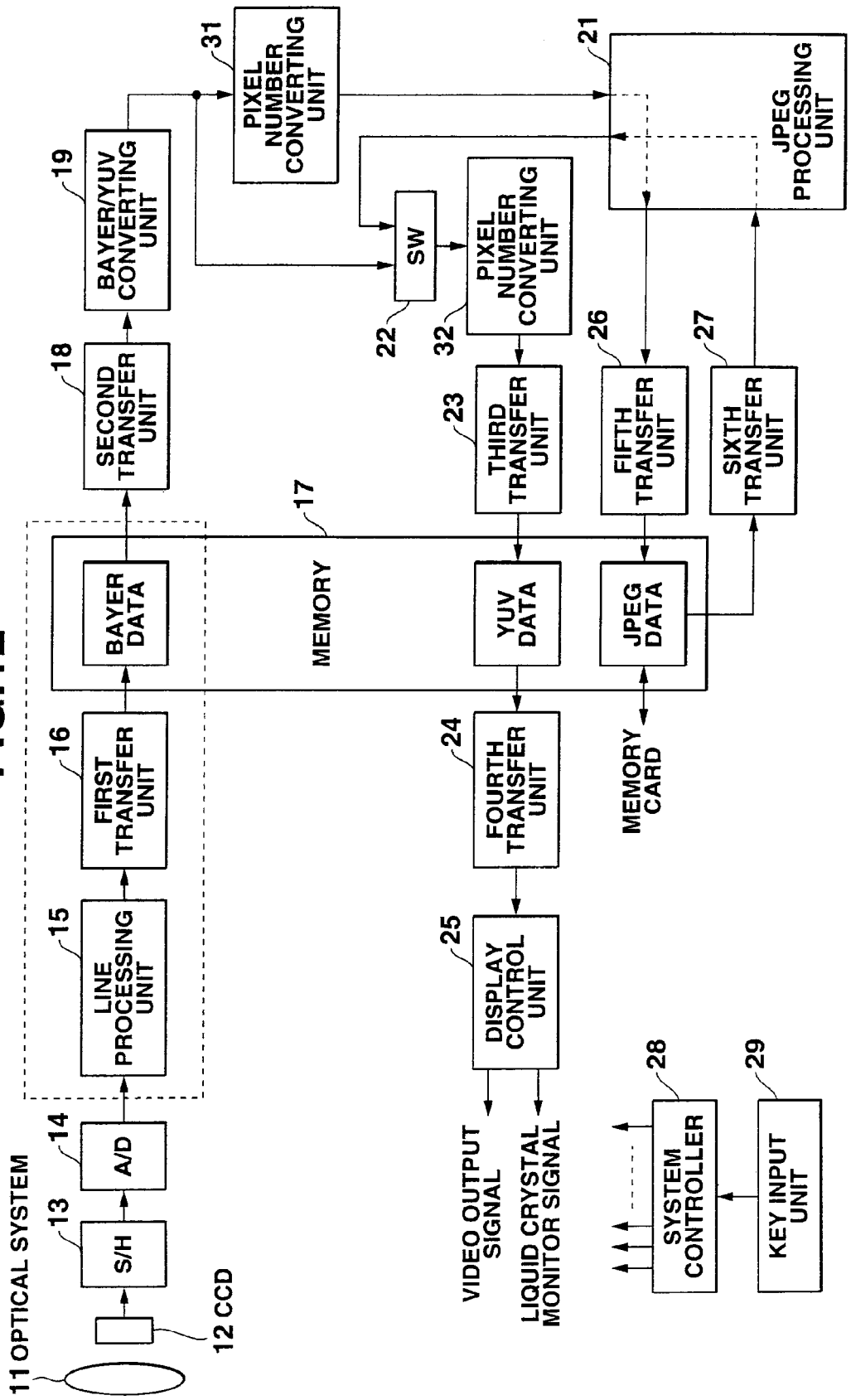

DIGITAL CAMERA WITH ELECTRONIC ZOOMING FUNCTION

CROSS-REFERENCE TO RELATED APPLICATIONS

The present application is a Divisional Application of U.S. application Ser. No. 10/186,530, filed Jul. 1, 2002, which is based upon and claims the benefit of priority from the prior Japanese Patent Application No. 2001-202518, filed Jul. 3, 2001, the entire contents of which are incorporated herein by reference.

BACKGROUND OF THE INVENTION

1. Field of the Invention

The present invention relates to a digital camera that can enlarge an image and an image processing method for enlarging an image.

2. Description of the Related Art

Recently, the development of personal computers has contributed to the wide spread of digital still cameras that record digital image data obtained using an image pick-up element, in a memory card in place of a silver film.

FIG. 1 shows the configuration of a circuit in a digital still camera of this kind. When one image is picked up (single image pick-up), the illustrated circuit basically compresses YUV data (luminance and color difference data) before expanding one frame of the YUV data on a buffer memory.

An optical image obtained using an optical system 11 is formed as an image on a CCD 12 used as an image pick-up element. The CCD 12 includes, for example, an RGB color filter of Bayer type. Color image data obtained (hereinafter referred to as "Bayer data") is sequentially sampled and held by a sample and hold circuit (S/H) 13, subsequently digitized by an A/D converter 14, and then supplied to a line processing unit 15.

The line processing unit 15 integrates the sequentially transmitted Bayer data into line data. A first transfer unit 16 transfers the Bayer data, integrated into the line data, to a memory 17, where the data is expanded and stored.

Once a predetermined number of lines of Bayer data are expanded on the memory 17, these data are read in block units and transferred to a Bayer/YUV converting unit 19 by a second transfer unit 18A.

The Bayer/YUV converting unit 19 executes an interpolating process or a color space process to convert the Bayer data (RGB data) into the YUV data, luminance and color difference color image. Then, the data thus obtained are supplied to a JPEG processing unit 21 via a switch (SW) 20. On the other hand, a third transfer unit 23 transfers these data to the memory 7 via a switch 22. Then, the data is expanded and stored in the memory 7.

The YUV data stored in the memory 17 are transferred to a display control unit 25 by a fourth transfer unit 24. Then, the display control unit 25 generates and outputs an analog video output signal and a signal for display on a liquid crystal monitor.

The JPEG processing unit 21 executes a data compression process such as an ADCT (Adaptive Discrete Cosine Transform) process or Huffman encoding process to the YUV data transferred by the Bayer/YUV converting unit 19 via the switch 20. Thus, JPEG data of a drastically reduced amount is obtained. A fifth transfer unit 26 transfers the JPEG data thus obtained to the memory 17, where the data is expanded and stored.

The JPEG data expanded and stored in the memory 17 is recorded in a memory card as a storage medium.

On the other hand, in a reproduction mode, JPEG data read from the memory card is stored in the memory 17 and then read and transferred to the JPEG processing unit 21 by a sixth transfer unit 27. Then, the JPEG processing unit 21 converts the JPEG data to the original YUV data, and the third transfer unit 23 transfers this YUV data via the switch 22 to the memory 17 for storage. Subsequently, the data is delivered to the display control unit 25 by the fourth transfer unit 24.

The above described circuit operations are totally controlled by a system controller 28 including a CPU. The operation of the system controller 28 is controlled in response to key operation signals input from a key input unit 29 including a shutter key and a mode key.

Now, a specific process for generating the YUV data will be described in detail.

Bayer data obtained by the line processing unit 15 and expanded and stored in the memory 17 is illustrated in FIG. 2A.

If it is assumed that it is necessary to refer a pixel configuration of 5×5 pixels of the Bayer data (FIG. 2A) as shown in FIG. 2B in order to generate one pixel of the YUV data by the Bayer/YUV converting unit 19, the YUV data as shown in FIG. 2C is generated.

It is assumed that the YUV data generated is transferred and output in the order shown in FIG. 3 and comprises blocks each having a vertical size of four pixels. Then, the pixels of the original Bayer data are read in the order as shown in FIG. 4. That is, for the first block with the range of lines C1 to C8, the pixels are read in the following order:

(C1, 1)→(C1, 2)→(C1, 3)→(C1, 4)→(C1, 5)→(C1, 6)→(C1, 7)→(C1, 8)→(C2, 1)→(C2, 2)→ . . .

For the second block the starting line of which is shifted downward by four lines and which has the range of lines C5 to C12:

(C1, 5)→(C1, 6)→(C1, 7)→(C1, 8)→(Cl, 9)→(C1, 10)→(C1, 11)→(C1, 12)→(C2, 5)→(C2, 6)→ . . .

Compared to the Bayer data read in this pixel position order, the pixels of the YUV data is transferred in the following order. For the first block:

(C3, 3)→(C3, 4)→(C3, 5)→(C3, 6)→(C4, 3)→(C4, 4)→(C4, 5)→(C4, 6)→(CS, 3)→(CS, 4)→ . . .

For the second block:

(C3, 7)→(C3, 8)→(C3, 9)→(C3, 10)→(C4, 7)→(C4, 8)→(C4, 9)→(C4, 10)→(CS, 7)→(C5, 8)→ . . .

FIG. 5A shows the configuration of pixels obtained when the YUV data is generated from Bayer data as described above. In the Bayer data in FIG. 5A, the hatched pixel shows a pixel used in generating the YUV data but which does not directly generate the corresponding YUV data.

In a Bayer data block read from the memory 17 and comprising eight lines, upper four lines are also read in the upper adjacent block. Thus, the YUV data generated in correspondence with these lines is configured not to contain any duplicate lines.

FIG. 5B illustrates the relationship between a Bayer data block read from a Bayer data frame and a YUV data block generated from the Bayer data block.

As described above, when the YUV data is generated from the Bayer data, the minimum required YUV data is generated, as shown in FIG. 5A.

Accordingly, the vertical size of the YUV data block is set at 8 if the required data is 4:2:2 (Y:Cb:Cr), and is set at 16 if the required data is 4:2:0. Then, the JPEG processing unit 21, which subsequently compresses the data, executes the process on every block comprising 8×8 pixels. Consequently, the YUV data can be transferred directly to the JPEG processing unit 21.

Here, with the circuit configuration shown in FIG. 1, in order to increase the speed of an electronic zooming process (enlarging process) in which the image data obtained through image pick-up is interpolated to increase the number of pixels constituting the image, it is assumed that a circuit that executes a pixel number conversion using hardware is provided succeeding to the Bayer/YUV converting unit 19, for example, between the switch 22 and the third transfer unit 23, instead of executing the enlarging process after expanding and storing one frame of YUV data on the memory 17. On these assumptions, since only the minimum required YUV data is transferred as described above, the interpolating process fails to generate pixels located between the pixels on the lowermost line of a YUV data block and the pixels on the uppermost line of the next YUV data block.

Thus, on the assumption that the same pixels as those on the lowermost line of the YUV data block are added as a line immediately below the lowermost line or that the pixels on lowermost line of the YUV data block are overlapped with the line immediately below the lowermost line, the pixel number converting circuit must execute an interpolating process (enlarging process) using these duplicate pixels. As a result, disadvantageously, the image is more markedly degraded as the enlargement ratio for electronic zooming increases in the vertical direction.

Further, it is assumed that the pixel number converting circuit executes an electronic zooming process (enlarging process) on each YUV data block. Then, since each YUV data block contains the same number of lines, it contains the same number of lines even after the enlarging process (interpolating process). Thus, disadvantageously, the available enlargement ratio (enlargement ratio) is limited.

Furthermore, if the pixel number converting circuit is to execute an electronic zooming process (enlarging process) on YUV data blocks and the YUV data block generated by the Bayer/YUV converting process is transferred directly to the JPEG processing unit 21, the YUV data, which has not undergone any electronic zooming process, is compressed and stored in the memory card. To avoid this, it is necessary to store the YUV data already subjected to an electronic zooming process in the memory 17 and transferring the read data to the JPEG processing unit 21. Consequently, much time is required to record the image.

BRIEF SUMMARY OF THE INVENTION

The present invention is directed to method and apparatus that substantially obviates one or more of the problems due to limitations and disadvantages of the related art.

According to an embodiment of the present invention, a digital camera comprises:

an image pick-up unit that picks up an image of an object and outputs image data;

a transfer unit that transfers the image data output from the image pick-up unit in units of a predetermined number of lines, with at least one line overlapping at least one line of an immediately following unit; and an enlarging process unit that enlarges the image data transferred from the transfer unit in units of the predetermined number of lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 5A and 5B are diagrams showing the concept of generating the YUV data from the Bayer data;

FIG. 8 is a diagram showing a relationship between a Bayer data transfer state and the YUV data correspondingly generated;

FIG. 9 is a diagram showing a different relationship between the Bayer data transfer state and the YUV data correspondingly generated;

FIG. 10 is a block diagram showing the configuration of a circuit in a digital still camera according to the second embodiment of the present invention;

FIG. 11 is a flow chart showing the contents of a process executed depending on whether or not the electronic zooming function is executed in the pick-up mode, according to the second embodiment;

FIG. 12 is a block diagram showing the configuration of a circuit in a digital still camera according to the third embodiment of the present invention;

DETAILED DESCRIPTION OF THE INVENTION

An embodiment of a digital still camera according to the present invention will now be described with reference to the accompanying drawings.

First Embodiment

Figure 1:
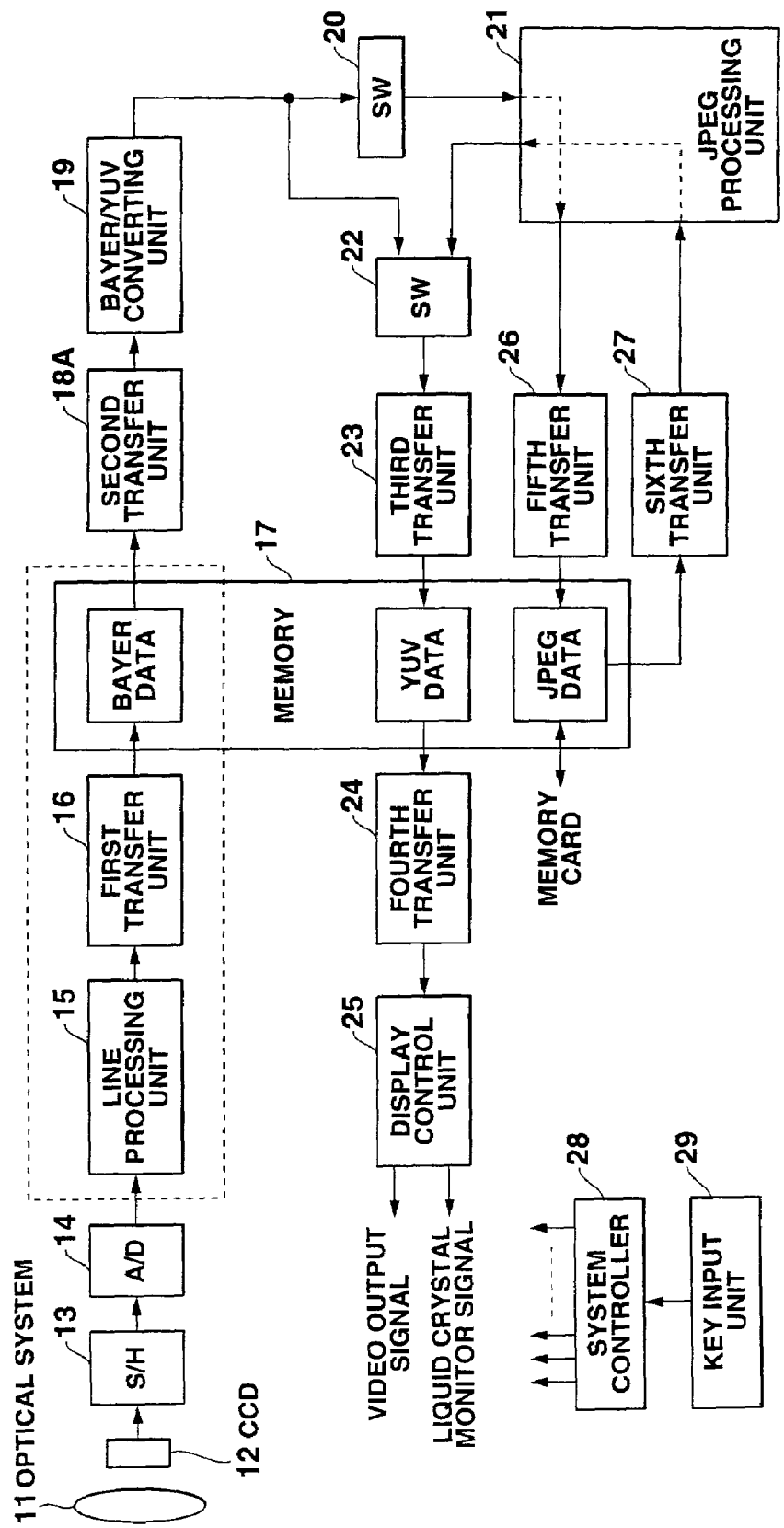
FIG. 1 is a block diagram showing the configuration of a circuit in a conventional digital still camera.
Figure 6:
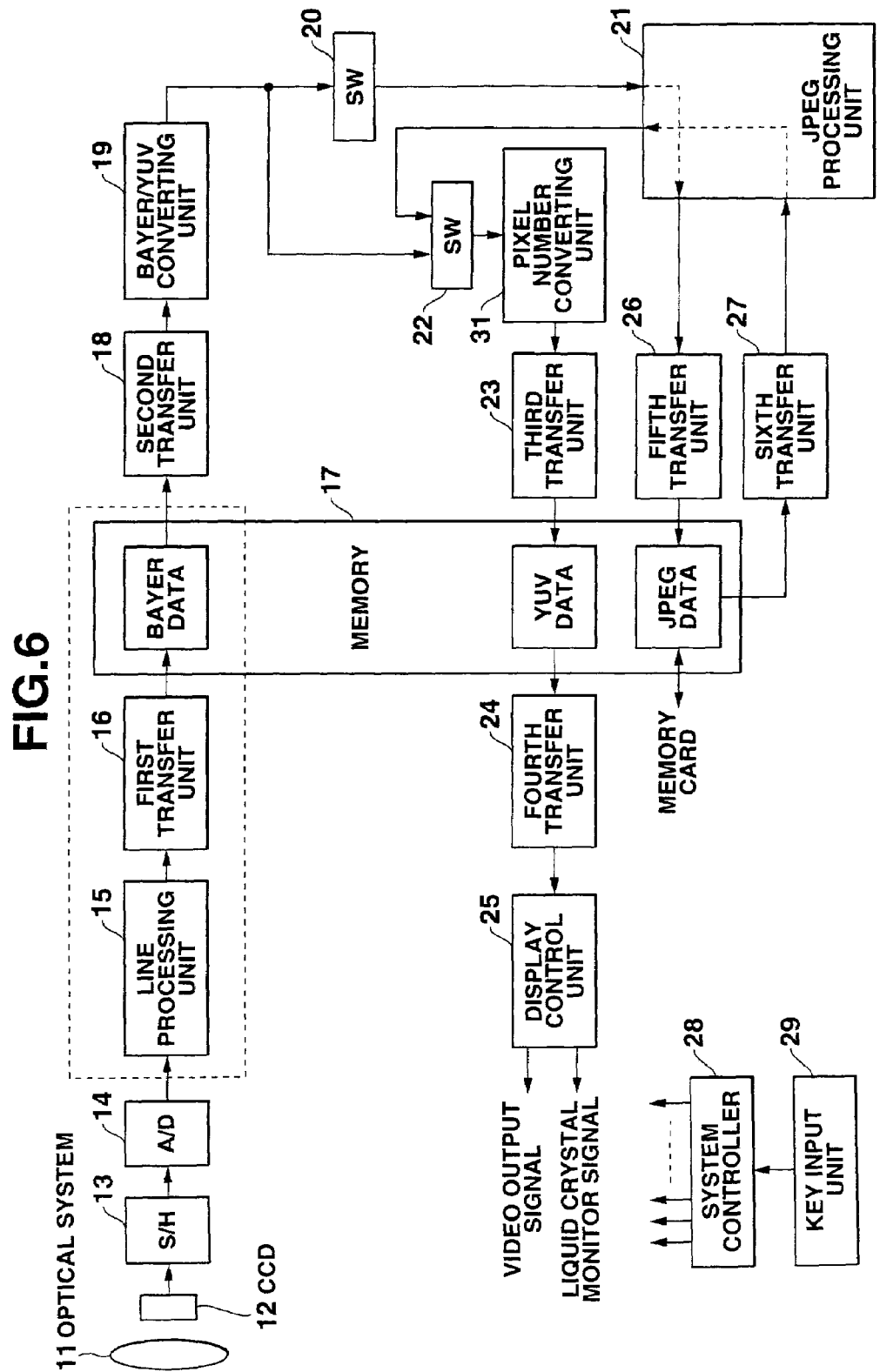
FIG. 6 is a block diagram showing the configuration of a circuit in a digital still camera according to the first embodiment of the present invention.

FIG. 6 is a block diagram showing the configuration of the first embodiment. The same portions as those shown in FIG. 1 will be indicated in the same reference numerals and their detailed description will be omitted.

Figures 2A, 2B, 2C:
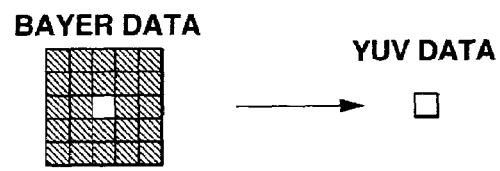
FIGS. 2A, 2B, and 2C are diagrams showing the concept of generating the YUV data from the Bayer data.

As shown in FIG. 2B, it is assumed that 5×5 pixels of Bayer data are required to generate one pixel of YUV data and a YUV data block generated from the Bayer data requires a vertical size of at least four pixels. In this case, the second transfer unit 18 for reading the Bayer data stored in the memory 17 reads the Bayer data in units of nine lines, while the data being shifted by four lines.

The circuit has a pixel number converting unit (enlarging process unit) 31 connected between the switch 22 that opens and closes a transfer path for YUV data blocks sequentially generated by the Bayer/YUV converting unit 19 and the third transfer unit 23 that expands and stores the YUV data blocks sequentially transferred via the switch 22, in the memory 17.

When an electronic zooming function is turned on, the pixel number converting unit 31 enlarges the sequentially input YUV data blocks, thereby increasing the number of pixels in the block according to an enlargement ratio.

Now, the operation of this embodiment will be described.

Figure 7:
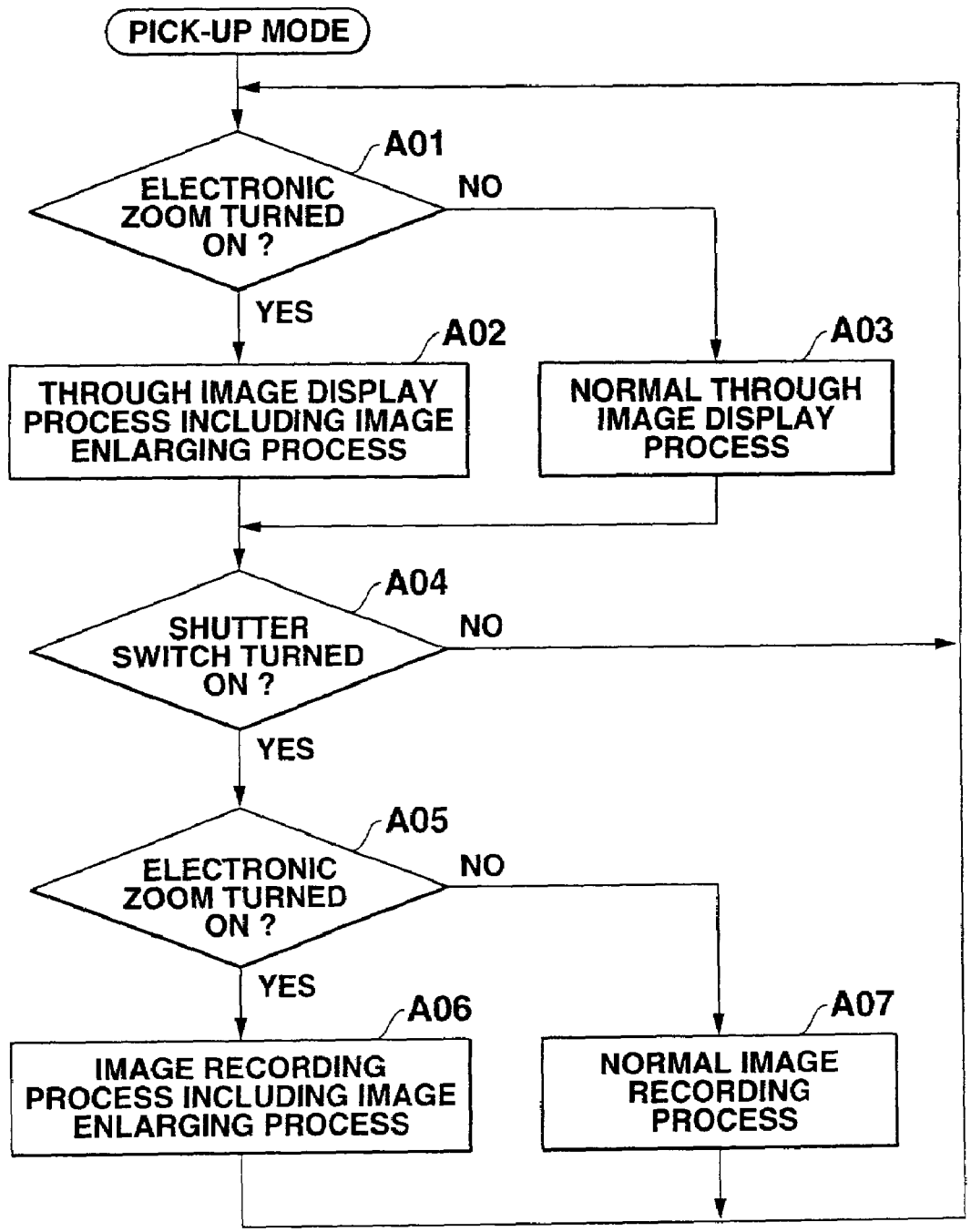
FIG. 7 is a flow chart showing the contents of a process executed depending on whether or not an electronic zooming function is to be executed in a pick-up mode, according to the first embodiment.

FIG. 7 shows the contents of a process executed depending on whether or not an electronic zooming operation is to be executed in a pick-up mode. First, it is determined whether or not an electronic zooming function is turned on using a zoom key included in the key input unit 29 (step A01).

If the electronic zooming function has not been turned on, the second transfer unit 18 reads the Bayer data in units of one block comprising eight lines from the memory 17 such that the upper four lines of the data block are overlapped by lower four lines of the upper adjacent data block, as shown in FIG. 5A. The second transfer unit 18 then transfers this block to the Bayer/YUV converting unit 19.

Thus, YUV data blocks sequentially generated by the Bayer/YUV converting unit 19 on the basis of the Bayer data contain no duplicate pixels. The YUV data blocks sequentially generated pass through the pixel number converting unit 31 via the switch 22 to reach the third transfer unit 23. The third transfer unit 23 transfers the data blocks to the memory 17, where the data blocks are expanded and stored. The fourth transfer unit 24 then transfers the data blocks to the display control unit 25. A liquid crystal monitor of this digital still camera displays and outputs the data blocks (step A03).

If it is determined at step A01 that the electronic zooming function is turned on, the second transfer unit 18 reads the Bayer data in units of one block comprising nine lines from the memory 17 as shown in FIG. 8. The second transfer unit 18 then transfers this block to the Bayer/YUV converting unit 19.

For example, the pixels of the Bayer data are read by the second transfer unit 18 in the following order. For the first block with the range of lines C1 to C9 shown in FIG. 4:

(C1, 1)→(C1, 2)→(C1, 3)→(C1, 4)→(C1, 5)→(C1, 6)→(C1, 7)→(C1, 8)→(C1, 9)→(C2, 1)→(C2, 2)→ . . .

For the second block the starting line of which is shifted downward by four lines and which has the range of lines C5 to C13:

(C1, 5)→(C1, 6)→(C1, 7)→(C1, 8)→(C1, 9)→(C1, 10)→(C1, 11)→(C1, 12)→(C1, 13)→(C2, 5)→(C2, 6)→ . . .

Accordingly, the Bayer/YUV converting unit 19 generates five lines of YUV data from nine lines of Bayer data. For example, the pixels of YUV data generated are transferred in the following order. For the first block:

(C3, 3)→(C3, 4)→(C3, 5)→(C3, 6)→(C3, 7)→(C4, 3)→(C4, 4)→(C4, 5)→(C4, 6)→(C4, 7)→(C5, 3)→(C5, 4)→ . . .

For the second block:

(C3, 7)→(C3, 8)→(C3, 9)→(C3, 10)→(C3, 11)→(C4, 7)→(C4, 8)→(C4, 9)→(C4, 10)→(C4, 11)→(C5, 7)→(C5, 8)→ . . .

In this manner, the YUV data in the block located at a certain position is generated so that the lowermost line of the data is overlapped with (is the same as) the uppermost line of the YUV data in the next block, as shown by the hatching in FIG. 8.

On the YUV data block generated so as to contain one duplicate line, the pixel number converting unit 31 executes, via the switch 22, a pixel converting process including an image enlarging process corresponding to the enlargement ratio. During this enlarging process, the YUV data block is intentionally transferred so as to partially overlap the following data block as described above. Consequently, when pixels lying between blocks are generated, an image to be generated is not degraded.

Specifically, the enlarging process comprises referencing 2×2 pixels of the YUV data to generate pixel data to be located in the center of these pixels, by interpolation. Since a duplicate line is added to the YUV data block as the fifth line, pixel data for an interpolating line between the fourth line of this data block and the first line of the next data block can be generated by using the YUV data in the fourth and fifth lines and referencing an area of 2×2 pixels in each of these lines when the fourth line of the YUV data is to be processed.

Then, the third transfer unit 23 transfers the YUV data blocks sequentially obtained through the enlarging process and each having an increased number of lines, to the memory 17, where the data blocks are expanded and stored. The fourth transfer unit 24 then transfers each YUV data block to the display control unit 25. The liquid crystal monitor of this digital still camera displays and outputs a required display range (step A02).

In this case, the YUV data in the fifth line of the block is only used by the pixel number converting unit 31 to execute an enlarging process for electronic zooming. The third transfer unit 23 does not transfer the YUV data in this fifth line to the memory 17.

The monitor display process is thus executed at step A02 or A03 depending on whether or not the electronic zooming function is turned on. Then, while repeatedly executing a process of determining whether or not the shutter key included in the key input unit 29 is operated (step A04) and if not, returning to the process starting with step A01, the apparatus waits for the shutter key to be operated.

If it is determined at step A04 that the shutter key is operated, then it is determined whether or not the electronic zooming function is turned on (step A05).

If the electronic zooming function has not been turned on, a normal image recording process is executed. That is, the Bayer data obtained through an image pick-up operation performed by the CCD 12 at a next timing will be transmitted to the first transfer unit 16 via the sample and hold circuit 13, A/D converter 14, and line processing unit 15. The first transfer unit 16 then transfers the Bayer data to the memory 17 for storage. Then, the second transfer unit 18 reads every block of the Bayer data comprising eight lines from the memory 17. Subsequently, the Bayer/YUV converting unit 19 generates the YUV data blocks each comprising four lines and having no duplicates as shown in FIGS. 5A and 5B.

The YUV data blocks sequentially generated by the Bayer/YUV converting unit 19 and each comprising four lines are sequentially transferred to the JPEG processing unit 21 via the switch 20. Each of the data blocks is then compressed to obtain the JPEG data in units of block. The fifth transfer unit 26 then transfers one frame of JPEG data to the memory 17 for storage and then records these data in a memory card (step A07).

Once the normal image recording process is executed, the process returns to step A01 to provide for the next pick-up session.

If it is determined at step A05 that the electronic zooming function is turned on when the shutter key is operated, then an image recording process including an image enlarging process is executed. The Bayer data obtained through an image pick-up operation performed by the CCD 12 at a next timing will be transmitted to the first transfer unit 16 via the sample and hold circuit 13, A/D converter 14, and line processing unit 15. The first transfer unit 16 then transfers the Bayer data to the memory 17 for storage. Then, the second transfer unit 18 reads every block of the Bayer data comprising nine lines from the memory 17. Subsequently, the Bayer/YUV converting unit 19 generates the YUV data blocks each comprising five lines including one duplicate line as shown in FIG. 8.

The YUV data blocks generated by the Bayer/YUV converting unit 19 and each comprising five lines are sequentially transferred to the pixel number converting unit 31 via the switch 22. The pixel number converting unit 31 then enlarges the data block so as to increase the number of pixels according to the currently set enlargement ratio. Subsequently, the third transfer unit 23 transfers the obtained YUV data block to the memory 17 for storage.

Specifically, this enlarging process comprises referencing 2×2 pixels of the YUV data to generate pixel data to be located in the center of these pixels, by interpolation, as described above. Since a duplicate line is added to the YUV data block as the fifth line, pixel data for an interpolating line between the fourth line of this data block and the first line of the next data block can be generated by using the YUV data in the fourth and fifth lines and referencing an area of 2×2 pixels in each of these lines when the fourth line of the YUV data is to be processed.

Subsequently, the sixth transfer unit 26 transfers the YUV data enlarged and stored in the memory 17 to the JPEG processing unit 21. The JPEG processing unit 21 then compresses the data to obtain JPEG data. The fifth transfer unit 26 then transfers the JPEG data to the memory 17 for storage and then records these data in the memory card (step A06).

Once the image recording process including the image enlarging process is executed, the process returns to step A01 to provide for the next pick-up session.

In the above embodiment, it is assumed that 5×5 pixels including two pixels (n=2) on each side of the target pixel are required for reference, and the YUV data is formed such that blocks each containing one duplicate line (m=1) as shown in FIG. 8. However, the present invention is not limited to this example. The second transfer unit 18 may sequentially transfer the Bayer data in units of (4n+m) (m and n are natural numbers) lines to the Bayer/YUV converting unit 19, while the data being shifted by 2n lines. Then, the Bayer/YUV converting unit 19 generates YUV data formed of blocks each formed of (2n+m) lines based on (2n+1) pixels on each side of the target pixel. The variables m and n can be arbitrarily set within the range of natural numbers.

For example, if n=m=2, then each block read from the memory 17 and transferred to the Bayer/YUV converting unit 19 by the second transfer unit 18 comprises 10 (=4× 2+2) lines, and the starting line of each block is shifted by four (=2×2) lines. Correspondingly, the Bayer/YUV converting unit 19 sequentially generates the YUV data comprising 6 (=2×2+2) lines including two duplicate lines.

In this case, the pixels of the Bayer data are read by the second transfer unit 18 in the following order. For the first block with the range of lines C1 to C10 shown in FIG. 9:

(C1, 1)→(C1, 2)→(C1, 3)→(C1, 4)→(C1, 5)→(C1, 6)→(C1, 7)→(C1, 8)→(C1, 9)→(C1, 10)→(C2, 1)→(C2, 2)→ . . .

For the second block the starting line of which is shifted downward by four lines and which has the range of lines C5 to C14:

(C, 5)→(C1, 6)→(C1, 7)→(C1, 8)→(C1, 9)→(C1, 10)→(C1, 11)→(C1, 12)→(C, 13)→(C, 14)→(C2, 5)→(C2, 6)→ . . .

Accordingly, the Bayer/YUV converting unit 19 generates six lines of YUV data from these ten lines of Bayer data. For example, the pixels of the generated YUV data are transferred in the following order. For the first block:

(C3, 3)→(C3, 4)→(C3, 5)→(C3, 6)→(C3, 7)→(C3, 8)→(C4, 3)→(C4, 4)→(C4, 5)→(C4, 6)→(C4, 7)→(C5, 3)→(C5, 4)→ . . .

For the second block:

(C3, 7)→(C3, 8)→(C3, 9)→(C3, 10)→(C3, 11)→(C3, 12)→(C4, 7)→(C4, 8)→(C4, 9)→(C4, 10)→(C4, 11)→(C5, 7)→(C5, 8)→ . . .

In this manner, the YUV data in the block located at a certain position are generated so that the lower two lines of the data are overlapped with the upper two lines of the YUV data in the next block, as shown by the hatching in FIG. 9.

In this case, a specific process executed by the pixel number converting unit 31 comprises referencing 4×4 pixels of the YUV data to generate pixel data to be located in the center of these pixels, by interpolation. Since two duplicate lines are added to the YUV data block as the fifth and sixth lines, pixel data for an interpolating line between the fourth line of this data block and the first line of the next data block can be generated by using the YUV data in the third to sixth lines (four lines) and referencing an area of 4×4 pixels in each of these lines when the fourth line of the YUV data is to be processed.

As described above, according to this embodiment, the second transfer unit 18 transfers the Bayer data to allow the Bayer/YUV converting unit 19 to generate the YUV data blocks each having m duplicate lines so that the image is not degraded when the pixel number converting unit 31 executes an enlarging process for electronic zooming. Therefore, the image is prevented from being degraded during electronic zooming without using any complicated circuit configuration.

In the first embodiment, only color image data is processed. However, monochromic image data can be similarly and easily processed by executing a similar process while noting only Y, a luminance component of YUV data.

Other embodiments of the digital still camera according to the present invention will be described. The same portions as those of the first embodiment will be indicated in the same reference numerals and their detailed description will be omitted.

Second Embodiment

A digital still camera according to the second embodiment of the present invention will be described below with reference to the drawings.

FIG. 10 shows the configuration of a circuit in the camera, and is essentially similar to that shown in FIG. 6.

The pixel number converting unit 31 is placed immediately succeeding to the Bayer/YUV converting unit 19. The Bayer/YUV converting unit 19 supplies its outputs to the JPEG processing unit 21 and third transfer unit 23 via the switches 20 and 22.

Next, the operation of this embodiment will be described.

FIG. 11 shows the contents of a process executed depending on whether or not an electronic zooming operation is to be executed in the pick-up mode. First, it is determined whether or not the electronic zooming function is turned on using the zoom key included in the key input unit 29 (step B01).

If the electronic zooming function has not been turned on, the second transfer unit 18 reads the Bayer data in units of eight lines from the memory 17 with the upper four lines being overlapped with the lower four lines of the upper block, as shown in FIG. 5A. The second transfer unit 18 then transfers this block to the Bayer/YUV converting unit 19.

Thus, YUV data blocks sequentially generated by the Bayer/YUV converting unit 19 on the basis of the Bayer data contain no duplicate pixels. The YUV data blocks sequentially generated pass through the pixel number converting unit 31 and switch 22 to reach the third transfer unit 23. The third transfer unit 23 transfers the data blocks to the memory 17, where the data blocks are expanded and stored. The fourth transfer unit 24 then transfers the data blocks to the display control unit 25. The liquid crystal monitor of this digital still camera subsequently displays and outputs the data blocks (step B03).

If it is determined at step B01 that the electronic zooming function is turned on, the second transfer unit 18 reads every block of Bayer data comprising nine lines from the memory 17 as shown in FIG. 8. The second transfer unit 18 then transfers this block to the Bayer/YUV converting unit 19.

For example, the pixels of the Bayer data are read by the second transfer unit 18 in the following order. For the first block with the range of lines C1 to C9 shown in FIG. 9, described above:

(C1, 1)→(C1, 2)→(C1, 3)→(C1, 4)→(C1, 5)→(C1, 6)→(C1, 7)→(C1, 8)→(C1, 9)→(C2, 1)→(C2, 2)→ . . .

For the second block the starting line of which is shifted downward by four lines and which has the range of lines C5 to C13:

(C1, 5)→(C1, 6)→(C1, 7)→(C1, 8)→(C1, 9)→(C1, 10)→(C1, 11)→(C1, 12)→(C1, 13)→(C2, 5)→(C2, 6)→ . . .

Accordingly, the Bayer/YUV converting unit 19 generates five lines of YUV data from these nine lines of Bayer data. For example, the pixels of YUV data generated are transferred in the following order. For the first block:

(C3, 3)→(C3, 4)→(C3, 5)→(C3, 6)→(C3, 7)→(C4, 3)→(C4, 4)→(C4, 5)→(C4, 6)→(C4, 7)→(C5, 3)→(C5, 4)→ . . .

For the second block:

(C3, 7)→(C3, 8)→(C3, 9)→(C3, 10)→(C3, 11)→(C4, 7)→(C4, 8)→(C4, 9)→(C4, 10)→(C4, 11)→(C5, 7)→(C5, 8)→ . . .

In this manner, the YUV data in the block located at a certain position is generated so that the lowermost line of the data is overlapped with the uppermost line of the YUV data in the next block, as shown by the hatching in FIG. 8.

On the YUV data block generated so as to contain one duplicate line, the pixel number converting unit 31 executes a pixel converting process including an image enlarging process corresponding to the current enlargement ratio. During this enlarging process, as specifically described above in the first embodiment, the YUV data block is intentionally transferred so as to partially overlap the following data block as described above. Consequently, when pixels lying between blocks are generated, a generated image is not degraded.

Then, the third transfer unit 23 transfers YUV data blocks sequentially obtained through the enlarging process and each having an increased number of lines (pixels), to the memory 17, where the data blocks are expanded and stored. The fourth transfer unit 24 then transfers each YUV data block to the display control unit 25. The liquid crystal monitor of this digital still camera displays and outputs a required display range (step B02).

The monitor display process is thus executed at step B02 or B03 depending on whether or not the electronic zooming function is turned on. Then, while repeatedly executing a process of determining whether or not the shutter key included in the key input unit 29 is operated (step B04) and if not, returning to the process starting with step B01, the apparatus waits for the shutter key to be operated.

If it is determined at step B04 that the shutter key is operated, then it is determined whether or not the electronic zooming function is turned on (step B05).

If the electronic zooming function has not been turned on, a normal image recording process is executed. That is, Bayer data obtained through an image pick-up operation performed by the CCD 12 at a next timing will be transmitted to the first transfer unit 16 via the sample and hold circuit 13, A/D converter 14, and line processing unit 15. The first transfer unit 16 then transfers the Bayer data to the memory 17 for storage. Then, the second transfer unit 18 reads every block of the Bayer data comprising eight lines from the memory 17. Subsequently, the Bayer/YUV converting unit 19 generates the YUV data blocks each comprising four lines and having no duplicate lines as shown in FIG. 5A.

The YUV data blocks sequentially generated by the Bayer/YUV converting unit 19 and each comprising four lines are sequentially transferred to the JPEG processing unit 21 via the switch 20. The JPEG processing unit 21 executes a data compressing process on the YUV data in units of two blocks each comprising eight lines to obtain JPEG data in units block (step B08).

The fifth transfer unit 26 then transfers one frame of JPEG data to the memory 17 for storage and then records these data in the memory card (step B09).

Once the normal image recording process is executed, the process returns to step B01 to provide for the next pick-up session.

If it is determined at step B05 that the electronic zooming function is turned on when the shutter key is operated, then it is determined whether or not the enlargement ratio specified by operating the zoom key is set at just 1:2 (step B06).

If the enlargement ratio is not set to 1:2, an image recording process including an image enlarging process is executed. The Bayer data obtained through an image pick-up operation performed by the CCD 12 at a next timing will be transmitted to the first transfer unit 16 via the sample and hold circuit 13, A/D converter 14, and line processing unit 15. The first transfer unit 16 then transfers the Bayer data to the memory 17 for storage. Then, the second transfer unit 18 reads every block of the Bayer data comprising nine lines from the memory 17. Subsequently, the Bayer/YUV converting unit 19 generates YUV data blocks each comprising five lines including one duplicate line as shown in FIG. 8.

The pixel number converting unit 31 then enlarges the YUV data block generated by the Bayer/YUV converting unit 19 and comprising five lines, so as to increase the number of pixels (lines) according to the currently set enlargement ratio. Then, the pixel number converting unit 31 sequentially transfers the YUV data to a buffer memory (not shown) via the switch 20. The YUV data is expanded and stored in the buffer memory until storage of one frame of data is completed.

Once one frame of YUV data is stored in the buffer memory, eight lines of YUV data, which are suitable for a JPEG process, are read from the buffer memory and transferred to the JPEG processing unit 21. The JPEG processing unit 21 compresses the transferred data to generate the JPEG data (step B07).

Thereafter, the fifth transfer unit 26 transfers the JPEG data thus generated to the memory 17 for storage and then records the data in the memory card (step B09). Once the image recording process including the image enlarging process is executed, the process returns to step B01 to provide for the next pick-up session.

If it is determined at step B06 that the electronic zooming function is turned on and that the enlargement ratio is set to just 1:2, an image recording process including an image enlarging process is executed. The Bayer data obtained through an image pick-up operation performed by the CCD 12 at a next timing will be transmitted to the first transfer unit 16 via the sample and hold circuit 13, A/D converter 14, and line processing unit 15. The first transfer unit 16 then transfers the Bayer data to the memory 17 for storage. Then, the second transfer unit 18 reads every block of the Bayer data comprising nine lines from the memory 17. Subsequently, the Bayer/YUV converting unit 19 generates YUV data blocks each comprising five lines including one duplicate line as shown in FIG. 8.

The YUV data blocks generated by the Bayer/YUV converting unit 19 and each comprising five lines are sequentially supplied to the pixel number converting unit 31. The pixel number converting unit 31 then enlarges the data so as to increase the number of pixels according to the currently set enlargement ratio. Then, the pixel number converting unit 31 sequentially transfers the YUV data obtained and formed of blocks each comprising eight lines, to the JPEG processing unit 21.

That is, one YUV data block input to the pixel number converting unit 31 comprises five lines, or four lines if the line overlapped with the adjacent block is excluded. In contrast, YUV data output by the pixel number converting unit 31 has their size doubled (interpolating process). Accordingly, one output YUV data block comprises eight lines, which is double the size of the input YUV data block, if the line overlapped with the adjacent block is excluded. This size is suitable for 8×8 pixels, a basic process unit for the JPEG process. In this case, the output data is transferred directly to the JPEG processing unit 21. The JPEG processing unit 21 then compresses the transferred data to generate the JPEG data in block units (step B08).

The fifth transfer unit 26 transfers the JPEG data thus generated to the memory 17 for storage and then records the data in the memory card (step B09). Once the image recording process including the image enlarging process is executed, the process returns to step B01 to provide for the next pick-up session.

In this manner, the pixel number converting unit 31 is placed immediately succeeding to the Bayer/YUV converting unit 19 so that YUV data can be immediately compressed by the JPEG processing unit 21 without expanding one frame of the YUV data on the buffer memory with regard to the data that is not enlarged or is enlarged at a particular ratio. Therefore, the circuit configuration can be simplified to allow image data to be recorded on a medium in a shorter time.

In the second embodiment, the YUV data is generated so that each block data contains duplicate lines. However, even if YUV data is generated so as to contain no duplicate lines as described in FIG. 5A, similar effects are produced in that YUV data enlarged at a particular ratio can be transferred directly to the JPEG processing unit.

Third Embodiment

FIG. 12 shows the configuration of a circuit that is basically similar to that of the first and second embodiments shown in FIGS. 6 and 10.

The YUV data output by the Bayer/YUV converting unit 19 is supplied to the pixel number converting unit 31 and switch 22. The pixel number converting unit 31 transmits its outputs directly and only to the JPEG processing unit 21 without transmitting via the switch 20.

Further, a pixel number converting unit 32 configured similarly to the pixel number converting unit 31 is placed succeeding to the switch 22. If the electronic zooming function is turned on, the pixel number converting unit 32 enlarges the YUV data transmitted via the switch 22 and then transfers the enlarged data to the third transfer unit 23. The third transfer unit 23 transfers the data to the memory 17, where the data is expanded and stored.

Now, the operation of this embodiment will be described.

Figure 13:
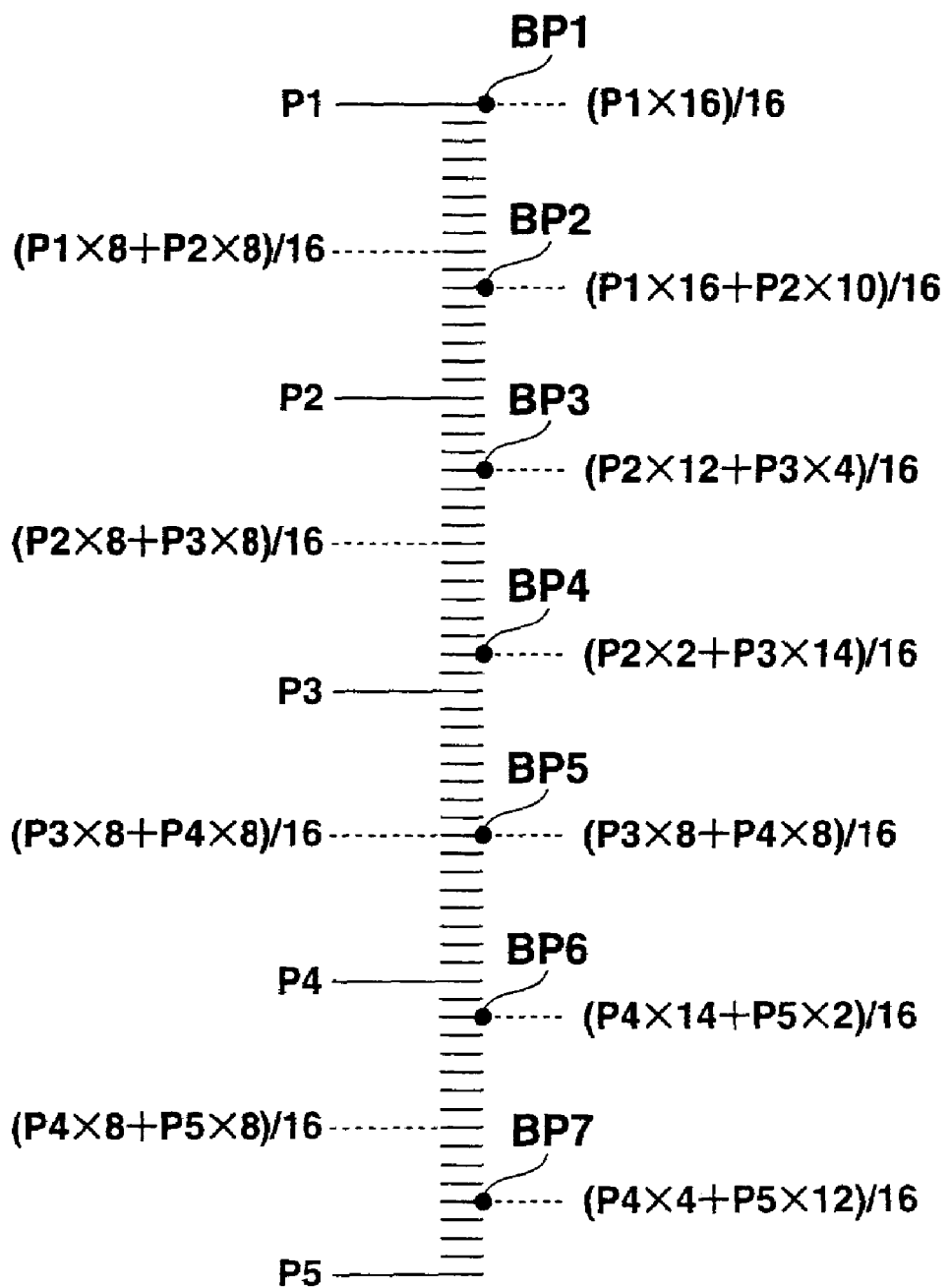
FIG. 13 is a diagram showing specific correspondences between pixels in an enlarging process according to the third embodiment.

FIG. 13 illustrates the specific contents of an enlarging process for electronic zooming executed by the pixel number converting units 31 and 32. For simplification, it is assumed that one YUV data block input to the pixel number converting unit 31 (32) comprises three lines and that this block has three pixels arranged in the vertical direction. It is further assumed that one block contains one duplicate line, which is enlarged and converted into three or four pixels by the pixel number converting unit 31.

Reference characters P1 to P5 denote pixel data input by the Bayer/YUV converting unit 19 and which has not been enlarged yet.

For the first block, lines corresponding to pixels P1 to P3 arranged in the vertical direction are input; for the second block, lines corresponding to pixels P3 to P5, each of which deviates from the corresponding pixel of the first block by two pixels, are input; for the subsequent block, lines corresponding to pixels P5 to P7 are input, etc. In this manner, pixels are input so that a line corresponding to one pixel is duplicated between adjacent blocks.

If new pixel is generated between two vertically adjacent pixels by an enlarging process, the points at which the difference between values for these two pixels is divided into 16 equal parts are determined by a sampling operation. FIG. 13 illustrates an enlarging process at an enlarging ratio of 16/10.

If a pixel P1 is first selected and new pixels are subsequently generated at the pixel intervals of 10/16, then the positions of the new pixels are as shown by the black points BP1, BP2, . . . in FIG. 13. For example, between points P4 and P5, pixels are generated at the positions of the two new black points BP6 and BP7. In this case, values for these new pixels are each determined as shown in the following sampling operations so as to precisely reflect the contents of a value for the corresponding original pixel, which is closer to this new pixel on the basis of the distance to the original pixel.

$$BP6=(P4\times14+P5\times2)/16$$

$$BP7=(P4\times4+P5\times12)/16$$

As shown in FIG. 13, pixel values for the four black points BP1 to BP4, including the original pixel P1, are generated from the first block, comprising the pixels P1 to P3. On the other hand, pixel values for the three black points BP5 to BP7 are generated from the second block, comprising the pixels P3 to P5.

Figures 3, 4:
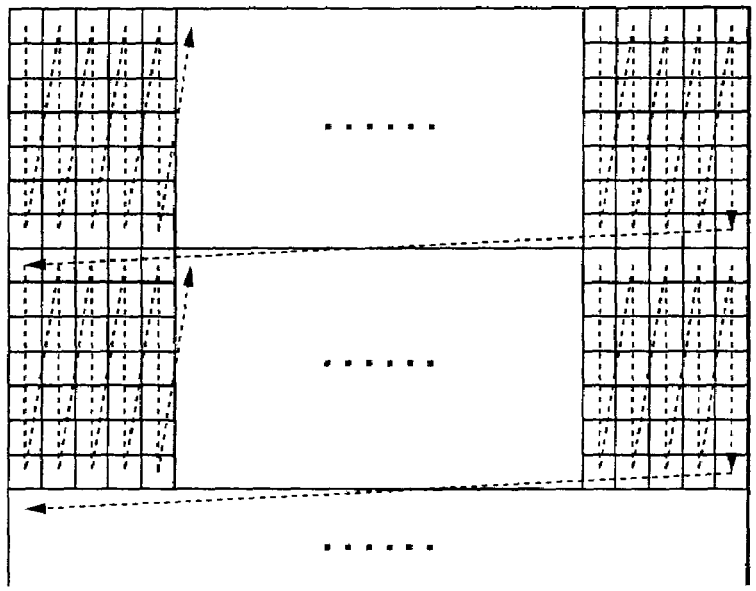
FIG. 3 is a diagram showing the concept of generating the YUV data from the Bayer data.
FIG. 4 is a diagram showing the concept of generating the YUV data from the Bayer data.

In this case, only the enlargement in the vertical direction is considered. Here, it is assumed that the original YUV data contains 100 pixels in the horizontal direction and that no enlarging process is executed in the horizontal direction. Then, an enlarging process executed on the entire first block results in 400 pixels, whereas an enlarging process executed on the entire second block results in 300 pixels. These pixels are transferred in the order as shown in FIG. 3.

Figure 14:
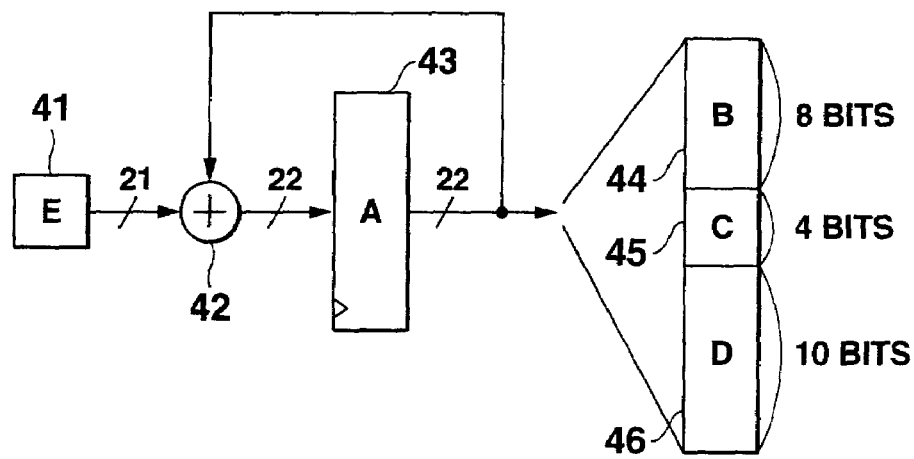
FIG. 14 is a block diagram showing the configuration of a circuit that extracts pixels according to the third embodiment.

FIG. 14 illustrates the configuration of a circuit provided in each of the pixel number converting units 31 and 32 to determine extracted pixels as described above, i.e. the position of a black point BPi. In this circuit, an adder 42 adds 21 bits of values stored in an E register 41 that stores pixel intervals established after an enlarging process, to 22 bits of values stored in an A register 43. The contents of the A register 43 are updated, so that this sum output is stored therein.

The 22 bits of values stored in the A register 43 are output and fed back to the adder 42 as described above, while being output as extracted pixels. The A register 43 is partitioned into a B register 44, a C register 45, and a D register 46 as shown in FIG. 14.

In this case, the B register 44 stores the higher 8 bits of the 22 bits to express the position of a line (a pixel in the vertical directions) in the original YUV data.

The C register 45 stores 4 bits of the 22 bits which follow the 8 bits in the B register to express an offset position from the line position indicated by the B register, specifically, a value for one of the points at which the difference between values for two pixels are divided into 16 parts.

The D register 46 stores the lower 10 bits of the 22 bits and is used as a dummy register to compensate for accuracy.

For example, it is assumed that pixels are extracted as shown in FIG. 13. Then, the initial value "000000(H)" is input to the A register 43, whereas the 21-bit numerical value "002800(H)" corresponding to the enlarged pixel interval "10(/16)" is set in the E register 41.

The higher 7 bits of the E register 41 form an integer part and are "000400(H)" in the case of an equal scale where no enlarging process is executed. Thus, the value "002800(H)" is set by:

000400(H)×10/16.

That is, for the first sampling position BP1, A="000000(H)", B="00(H)", and C="0(H)"; for the second sampling position BP2, A+E="002800(H)", B="00(H)", and C="a (H)" (=10); for the third sampling position BP2, A+E="005000(H)", B="01(H)", and C="4(H)", etc. In this manner, the contents of the A register 43 are sequentially increased by the value stored in the E register 41, thereby allowing pixels to be extracted.

After one vertical scanning operation is completed, the scanning operation shifts to the next pixel in the horizontal direction. Then, the contents of the A register 43 are initialized again to extract sampling positions.

Further, before the block is switched, the value stored in the E register 41 is added again to the contents of the A register 46 when the A register 43 is initialized. Then, this sum output is used as an initial value for the new block.

The accuracy of the operations involved in the above-described extraction of pixels varies depending on the size of the D register 46. In this embodiment, this accuracy is 10 bits.

The capacity of the B register 44 is set according to the maximum value of the number of pixels (=lines) in the vertical direction, which constitute one block of the original YUV data. For a practical reason, about 4 to 32 pixels are used, so that this register is set to have 8 bits so as to provide a sufficiently larger number of pixels.

After the pixel number converting unit 31 (32) has thus extracted pixels and executed the corresponding image conversions as an enlarging process, it transfers the YUV data obtained to the buffer memory (not shown). Then, the data is sequentially expanded and stored therein until storage of one frame of data is completed.

Once one frame of the YUV data has been stored in the buffer memory, the YUV data in units of eight lines, which is suitable for a JPEG process, is read from the buffer memory and transferred to the JPEG processing unit 21. The JPEG processing unit 21 compresses the transferred data to generate the JPEG data.

On the other hand, the third transfer unit 23 transfers the YUV data enlarged by the image converting unit 32 to the memory 17 for display. When the YUV data is transferred, line number data is also transferred for each block.

Figure 15:
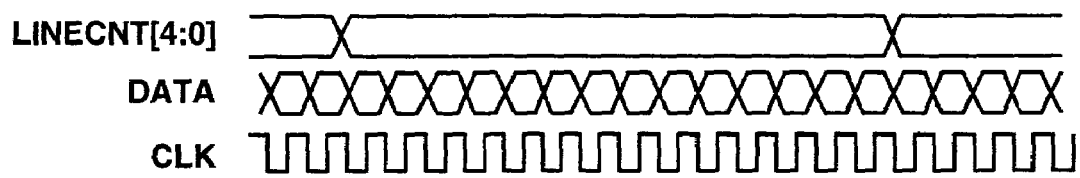
FIG. 15 is a diagram illustrating an output form of line number data according to the third embodiment.

FIG. 15 indicates that the line number data "LINECNT" is transferred concurrently with the YUV data "DATA". FIG. 15 also shows the reference clock "CLK".

FIG. 15 illustrates that the line number data comprises parallel data of 5-bits width on the assumption that one block can be enlarged so as to contain up to 16 pixels (lines).

Figure 16:
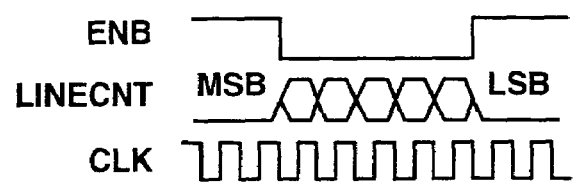
FIG. 16 is a diagram illustrating another output form of line number data according to the third embodiment.

FIG. 16 indicates that to serially transfer the YUV data, the line number data "LINECET" is serially transferred synchronously with the enable signal "ENB" prior to the YUV data. FIG. 16 also shows the reference clock "CLK".

In this manner, the number of pixels is increased or reduced by enlarging every block comprising a plurality of lines. If the number of lines constituting one block varies after the increase or reduction, this can be dealt with by outputting line number information to the following component.

If an enlarging process for electronic zooming is executed using the same number of pixel lines for every block, then a numeral value that can be set as an enlargement ratio is restricted, for example, an integer ratio must be established between the number of pixels present prior to enlargement and the number of pixels present after enlargement. However, this invention is not restricted by the enlargement ratio specified for an enlarging process for electronic zooming but enables the electronic zooming function to be provided at various enlargement ratios.

In the configuration shown in FIG. 12, the two pixel number converting units 31 and 32 are provided so that the pixel number converting unit 31 enlarges the YUV data to be compressed by the JPE processing unit 21 and then recorded in the memory card, while the pixel number converting unit 32 enlarges the YUV data to be displayed and output by the liquid crystal monitor or the like. This configuration is provided so as to execute, in parallel, the processes of displaying the YUV data on the monitor and recording the YUV data in the medium, which processes the YUV data comprising different numbers of pixels, thereby allowing the digital still camera to respond quickly without wasting time.

In the third embodiment, as in the first and second embodiments, the YUV data is generated so that each block thereof has lines overlapped with the next block. However, the YUV data may be generated so that blocks thereof contain no duplicate lines. In this case, different enlargement ratios are used to enlarge the respective blocks, thereby allowing various enlargement ratios for electronic zooming to be accommodated.

In the first to third embodiments, the present invention is applied to image data picked up by the CCD 12 in the pick-up mode. However, the present invention is also applicable to the image data read from a memory card in a reproduction mode.

In the first to third embodiments, the present invention is applied to a digital still camera. However, of course, the present invention is applicable to any image processing apparatus such as a digital movie camera, a television apparatus, or an image reproducing apparatus that has an electronic zooming function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera comprising:
   an image pick-up unit having a color filter including a predetermined color arrangement;
   a transfer unit that sequentially transfers, in units of a first number of lines, first color image data output from the image pick-up unit, each unit of the first number of lines including some lines included in a previous unit which has just been transferred; and
   first line number converting unit that generates second color image data, in unit of a second number of lines which is smaller than the first number of lines, the second color image data including pixels which are generated based on pixels within a predetermined pixel range around each pixel in the first color image data transferred from the transfer unit.

2. The digital camera according to claim 1, wherein the first line number converting unit generates luminance and color difference image data, in unit of the second number of lines.

3. The digital camera according to claim 1, further comprising a second line number conversion unit that carries out an enlarging process on the first color image data transferred from the first line number converting unit, thereby increasing the number of lines.

4. The digital camera according to claim 1, wherein the second color image data generated by the first line number converting unit in each unit includes some lines included in a subsequent unit to be generated next by the first line number converting unit.

5. The digital camera according to claim 1, wherein the second color image data of the second number of lines generated by the first line number converting unit does not include the second number of lines to be generated next by the first line number converting unit.

6. The digital camera according to claim 3, further comprising a zoom instruction unit that instructs an electronic zooming operation; and
   wherein the second line number converting unit carries out the enlarging process when the instruction unit instructs the electronic zooming operation.

7. The digital camera according to claim 6, wherein the transfer unit sequentially transfers color image data in units of a third number of lines smaller than the first number of lines when the zoom instruction unit does not instruct an electronic zooming operation, each unit of the third number of lines including some lines included in a previous unit which has just been transferred; and
   the first line number converting unit generates, when the zoom instruction unit does not instruct an electronic zooming operation, color image data in units of a fourth number of lines which is smaller than the third number of lines, the color image data including pixels within a predetermined pixel range in the color image data transferred from the transfer unit in units of the third number of lines,
   the camera further comprising a data compressing unit that compresses color image data transferred in units of the fourth number of lines from the first line number converting unit when the zoom instruction unit does not instruct an electronic zooming operation, or color image data on which the enlarging process has been carried out by the second line number converting means when the zoom instruction unit instructs an electronic zooming operation,
   wherein the color image data of the fourth number of lines generated by the first line number converting unit does not include color image data of the fourth number of lines to be generated next by the first line number converting unit.

8. The digital camera according to claim 3, further comprising:
   data compressing means for compressing color image data on which the enlarging process has been carried out by the second line number converting unit; and
   a transfer control unit that sequentially transfers to the data compressing unit, in units of the second number of lines, color image data which has been enlarged based on a predetermined zoom scale by the second line number converting unit.

9. The digital camera according to claim 8, further comprising:
   a zoom scale specifying unit that specifies a zoom scale of an electronic zooming operation; and
   a determining unit that determines whether or not the zoom scale specified by the zoom scale specifying unit is the predetermined zoom scale, and
   wherein the second line number converting unit enlarges, based on the zoom scale specified by the zoom scale specifying unit, the color image data sequentially transferred from the first line number converting unit in units of the second number of lines, and
   when the determining unit determines that the zoom scale is the predetermined zoom scale, the transfer control unit sequentially transfers to the data compressing unit, in units of the second number of lines, color image data which has been enlarged by the second line number converting unit.

10. The digital camera according to claim 9, wherein when the determining unit determines that the zoom scale is not the predetermined zoom scale, color image data in units of the second number of lines which has been enlarged by the second line number converting unit is sequentially decompressed in a memory, and read, in units of the number of lines of data compression of the data compressing unit to be transferred from the memory to the data compressing unit.

11. The digital camera according to claim 8, wherein the transfer unit sequentially transfers color image data in units of a third number of lines smaller than the first number of lines when a zoom scale in which an enlargement by the second line number converting portion is not required has been specified by the zoom scale specifying unit, each unit of the third number of lines including some lines included in a previous unit which has just been transferred; and the first line number converting unit generates, when a zoom scale in which an enlargement by the second line number converting portion is not required has been specified by the zoom scale specifying unit, color image data in units of a fourth number of lines which is smaller than the third number of lines, the color image data including pixels within a predetermined pixel range in the color image data transferred from the transfer unit in units of the third number of lines, and wherein the transfer control unit sequentially transfers to the data compressing unit color image data in units of the fourth number of lines which are sequentially transferred from the first line number converting unit when a zoom scale in which an enlargement by the second line number converting portion is not required has been specified by the zoom scale specifying unit, and the color image data of the fourth number of lines generated by the first line number converting unit does not include color image data of the fourth number of lines to be generated next by the first line number converting unit.

12. The digital camera according to claim 3, wherein the second line number converting unit includes means for enlarging color image data in units of the second number of lines which has been sequentially transferred from the first line number converting unit, each image data enlarged with a different increase number of lines.

13. The digital camera according to claim 12, wherein the second line number converting unit outputs information of a number of lines of color image data in units of the second number of lines after the image data has been enlarged.

14. An image processing method comprising:

sequentially transferring by a transfer unit, in units of a first number of lines, first color image data output from an image pick-up unit having a color filter including a predetermined color arrangement, each unit of the first number of lines including some lines included in a previous unit which has just been transferred; and generating second color image data by a converting unit, in unit of a second number of lines which is smaller than the first number of lines, the second color image data including pixels which are generated based on pixels within a predetermined pixel range around each pixel in the first color image data transferred from the transfer unit.

* * * * *